United States Patent [19]

Niemi

[11] Patent Number: 4,552,333
[45] Date of Patent: Nov. 12, 1985

[54] BAYONET CATCH FOR A LINE OF PRESSURIZED MEDIUM

[75] Inventor: Pertti K. Niemi, Vaasa, Finland
[73] Assignee: Oy Pajakanta AB, Finland
[21] Appl. No.: 574,413
[22] Filed: Jan. 27, 1984
[51] Int. Cl.[4] ............................................. F16L 29/00
[52] U.S. Cl. ........................... 251/149.9; 137/614.06; 285/DIG. 25
[58] Field of Search ............... 285/DIG. 25, 277, 316; 251/149.9, 89.5, 149.8, 149.2; 137/614.06

[56] References Cited

U.S. PATENT DOCUMENTS

| | | | |
|---|---|---|---|
| 1,700,073 | 1/1929 | Parker et al. | 251/149.9 |
| 2,505,245 | 4/1950 | Hollerith | 251/89.5 |
| 3,077,330 | 2/1963 | Lamphear | 251/89.5 |
| 3,404,705 | 10/1968 | Zopf et al. | 251/149.9 |
| 3,664,375 | 5/1972 | Marette | 137/614.06 |

FOREIGN PATENT DOCUMENTS 20837 of 1909 United Kingdom ............... 251/89.5

Primary Examiner—Samuel Scott
Assistant Examiner—Noah Kamen
Attorney, Agent, or Firm—Price, Heneveld

[57] ABSTRACT

A bayonet catch for a line of pressurized medium, comprising a tubular body (10), a lever (1) journalled pivotably to the body for turning a valve means (12), as well as coupling elements (4, 9) at the forward end of said body for disconnectable coupling of a connecting plug (11), said coupling elements comprising a push-pull sleeve surrounding the forward end of the body. A problem with pneumatic line bayonet catches is that, when a catch is opened, the outlet side pressure strikes at great force out of a releasing plug with a consequence that the disconnected line end may get out of hand and cause damage. The problem has been resolved in a manner that lever (1) positively operates both said valve means (12) for opening and closing a valve and said push-pull sleeve (4) for coupling and uncoupling said connecting plug (11), and that between valve means (12) and a connecting plug sealing member (8) said body (10) is provided with a passage (14) which in the open position of said valve is closed by a seal (6) of push-pull sleeve (4) but in the closed position of said valve, prior to the displacement of said push-pull sleeve into the position for disconnecting said connecting plug (11), said seal (6) withdraws from in front of passage (14) for allowing the outlet side pressure to discharge to atmosphere.

7 Claims, 6 Drawing Figures

BAYONET CATCH FOR A LINE OF PRESSURIZED MEDIUM

FIELD OF THE INVENTION

The present invention relates to a valve having a bayonet catch for connecting it to a discharge line.

BACKGROUND OF THE INVENTION

The valve has a tubular body, a lever journalled pivotably to the body for turning a valve means, as well as coupling elements at the forward end of said body for disconnectably coupling to it the connecting plug of a line, said coupling elements comprising a push-pull sleeve surrounding the forward end of the body.

A problem with such prior art bayonet catches for pneumatic lines is that, as the catch is opened, the working side pressure discharges at great force through a plug just disconnected with the consequence that the line might get out of hand and cause damage by hitting surrounding objects.

In order to overcome this problem, an object of the invention is to provide a bayonet catch that cannot be released until the working pressure within the coupling has been allowed to discharge to atmosphere in a controlled manner while the plug is still connected to the bayonet catch. This object is achieved by the invention on the basis of the characteristics set out in the annexed claims.

One embodiment of the invention will now be illustrated and described with reference made to the accompanying drawings.

DESCRIPTION OF THE PREFERRED EMBODIMENT

Figure 1:
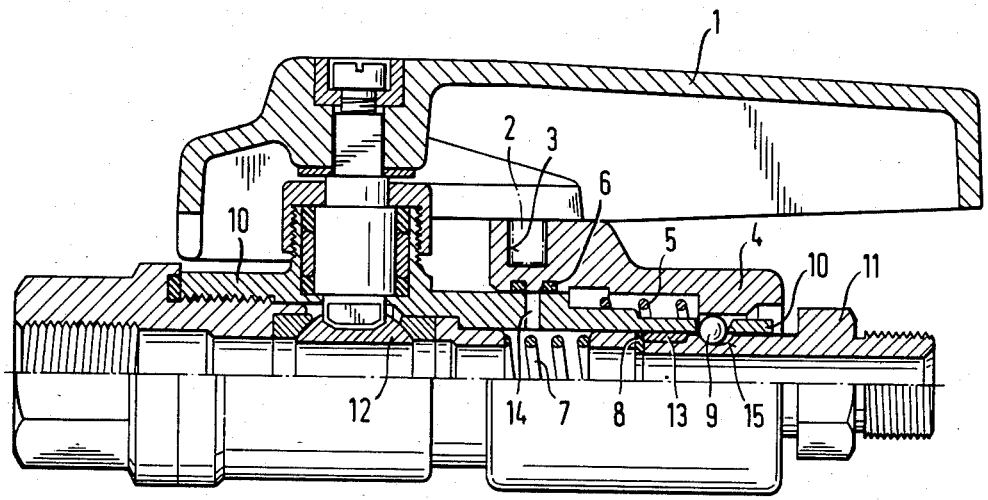
FIG. 1 shows a bayonet catch of the invention in longitudinal section with the catch connected and the valve in open position.
Figure 2:
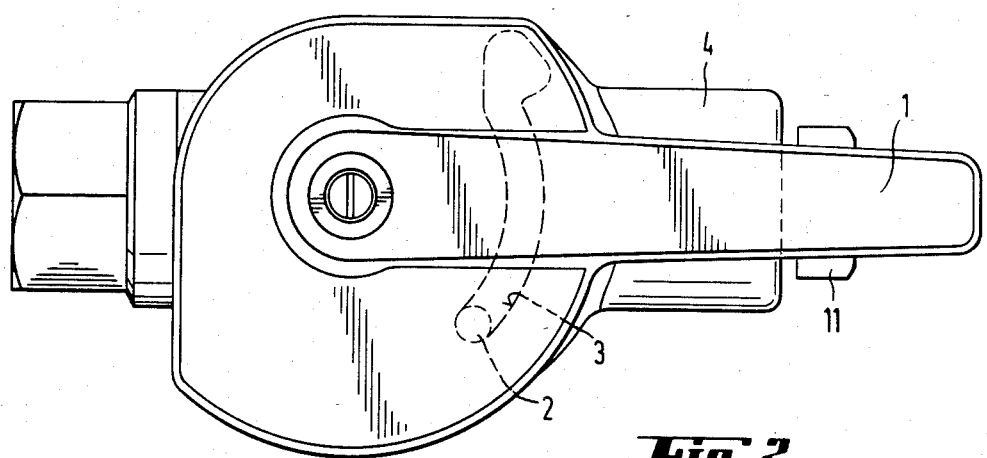
FIG. 2 is a plan view of the same bayonet catch.

The bayonet catch comprises a single-piece tubular body member 10 fitted with a pivotably journalled operating lever 1. Lever 1 turns a ball-shaped valve means 12 for opening and closing the flow of a pressurized medium, e.g. compressed air, from inlet side to outlet side. The inlet line is connected to the left-hand end of body 10 and the outlet line is connected to a connecting plug 11. Body 10 is provided with passages for balls 9 acting as coupling elements which, when plug 11 is inserted in position, sink in a groove 15 made in plug 11. A push-pull sleeve 4 prevents balls 9 from rising out of groove 15 with the consequence that plug 11 remains in position. The end of plug 11 rests against a seal 8 which is fitted in a sleeve 13 and biased by a spring 7. Between valve means 12 and seal 8, the body is provided with an outlet passage 14 which, in the case shown in FIG. 1, is closed by a seal 6 of said push-pull sleeve 4.

A dowel 2 mounted on operating lever 1 is engaged in a slideway 3 made in push-pull sleeve 4, the configuration of said slideway 3 determining the axial position of push-pull sleeve 4 at various swing angles of lever 1. Furthermore, a spring 5 urges push-pull sleeve 4 towards the connecting position.

Operation of the bayonet catch proceeds as follows.

Figure 3:
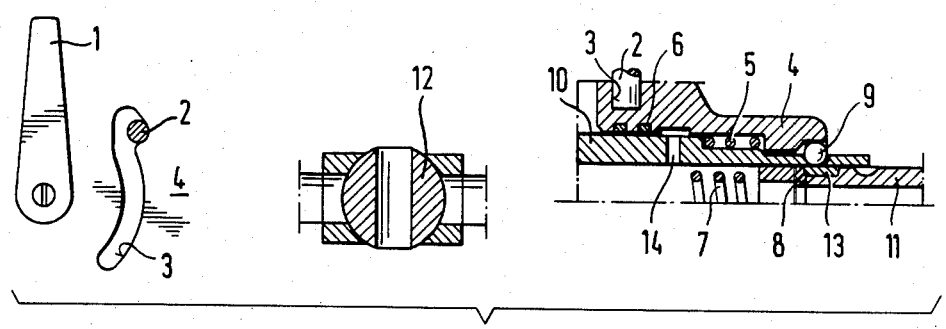
FIG. 3 shows diagrammatically the relative positions of various bayonet catch components with the valve closed and the connecting plug disconnected.
Figure 4:
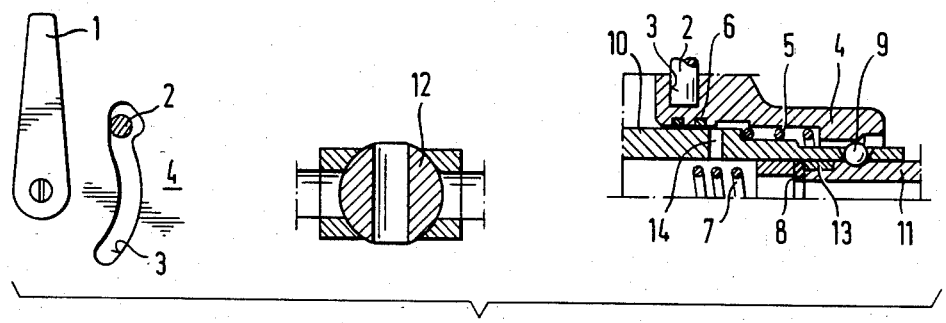
FIG. 4 is similar to FIG. 3 illustrating the stage when the plug is pushed in and the valve is still closed.
Figure 5:
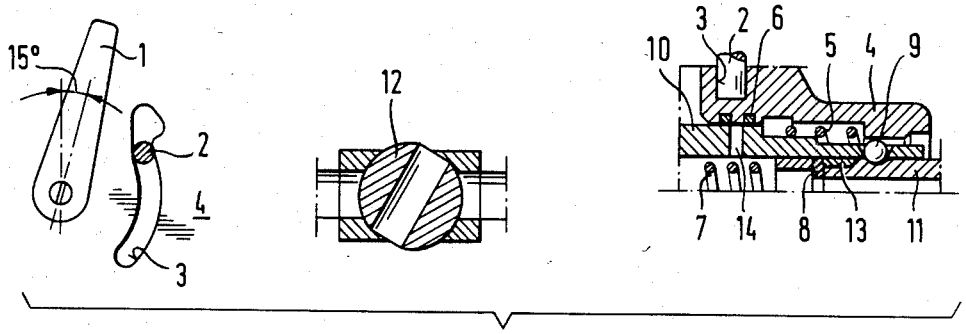
FIG. 5 shows the stage when operating lever has been turned through 15° for displacing a push-pull sleeve to close a bleed passage before the valve is opened.
Figure 6:
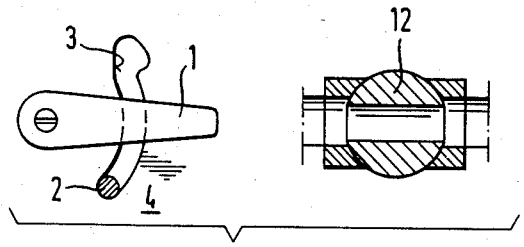
FIG. 6 shows the stage when lever has been turned to completely open the valve with other components remaining in the position shown in FIG. 5.

In the basic position shown in FIG. 3, the inlet side is pressurized and due to the position of lever 1 said ball 12 is closed. Dowel 2 is engaged in a curve at the end of slot 3 for locking lever 1 which is in its zero position, or in the position turned 90° aside. The external surface of sleeve 13 keeps balls 9 projected, said sleeve 4 thus remaining in retracted position. Shown in FIG. 4 is the connection of a connecting plug. Plug 11 is pushed into body 10, said seal 8 sealing the space between body 10 and plug 11. Sleeve 13 moves from under said balls 9 allowing them to drop in groove 15 formed on plug 11. At the same time, spring 5 pushes sleeve 4 on top of said balls 9, thus locking plug 11 in position. As sleeve 4 and the associated slot or slideway 3 are moving, the engagement between a curve at the end of slot 3 and dowel 2 is disengaged with a consequence that lever 1 can be turned. During the first 15° turn (FIG. 5), sleeve 4 slides forward in a manner that seal 6 closes the outlet passage 14 provided on body 10 with said ball 12 still remaining closed. As the swing or turn of lever 1 proceeds, said ball 12 begins to open and is fully open when lever 1 is parallel with the valve body (FIG. 6). During the turning motion of lever 1 between FIGS. 5 and 6, said sleeve 4 need not be displaced any longer but, instead, the dowel-slot deadlock 2, 3 serves to hold it in position. Disconnection of plug 11 is effected as follows. When lever 1 is turned towards the zero position shown in FIG. 3, ball 12 begins to close and is fully closed by the time said lever is 15° away from the zero position (FIG. 5). As the turning proceeds, the dowel-slot combination 2, 3 displaces sleeve 4 rearwards to withdraw seal 6 from in front of outlet passages 14, whereby the pressure remaining in the outlet side hoses and working machines discharges through outlet passages 14 to atmosphere. Turning of lever 1 to the zero position shown in FIG. 4 does not yet release plug 11 but, instead, lever 1 must be turned e.g. 10° further for allowing balls 9 to rise and spring 7 to push plug 11 out and to shove sleeve 13 under said balls 9 with a consequence that sleeve 4 is engaged in back-up position. When the grip is released from lever 1, said lever moves into the zero position, i.e. 90° aside.

I claim:

1. The combination of a manually operated valve and a bayonet type conduit to plug connection, said valve having a body with a fluid passes therethrough; a rotatable valve element mounted within said body for closing said passage and a lever external of said body connected to said valve element for rotation thereof between opened and closed positions, said valve body having a plug receiving tubular portion at one end of said passage and a sleeve surrounding said portion and slidable lengthwise of said portion; a bleed passage in said portion between said rotatable valve and said one end and communicating with said passage; said sleeve having closure means seating over said bleed passage when said sleeve is in plug locking position, a discharge passage in said sleeve positioned to communicate with said bleed passage when said sleeve is retracted toward said rotatable valve; means secured to said rotatable valve element for rotation therewith, said means engaging said sleeve for shifting said sleeve to connect said bleed passage and discharge passage after said rotatable valve element has reached a closed position and before moving the sleeve of plug release position whereby fluid pressure in the passage and coupling is released before the uncoupling the plug.

2. The combination described in claim 1 wherein the sleeve engaging means moves said sleeve to squentially lock said plug to the tubular portion and close the bleed passage before the rotary valve is turned sufficiently to open the passage.

3. In means for depressurizing the downstream side of a combination valve and bayonet plug connection for pressurized fluids, a valve body having a fluid passage therethrough, said bayonet connection being at the downstream end of said passage, a rotatable valve element intermediate the ends of said passage and actuator means for rotating said valve, said bayonet connection including a sleeve, said sleeve having a plug engaging and securing means, said sleeve being slidable axially of the passage, said sleeve including locking means for holding said securing means against plug release; a bleed opening communicating with the fluid passage between said securing means and valve, said sleeve having closure means for closing said bleed opening, a lost motion connection means between said actuator means and said sleeve, said connection means holding said sleeve with said closure means closing said bleed opening and said holding means in locking engagement with said securing means when said valve is rotated to open position; as said actuator is initially moved to close said valve, said lost motion connection means holding said sleeve stationary until said valve has closed the passage and thereafter sequentially shifting said sleeve to open said bleed passage and thereafter shifting said holding means into securing means release position whereby the plug can be removed.

4. The depressurizing means described in claim 3 wherein said lost motion connection means is a pin on one of said actuator and sleeve, and slot means on the other thereof; all of that portion of said slot means traversed by said pin while the valve remains sufficiently rotated to leave any portion of the passage open, holding sleeve stationary in the open valve position; and after the passage is closed said slot sequentially shifting said sleeve to open the bleed passage and release the securing means from said locking means.

5. The combination valve and bayonet described in claim 3 wherein said securing means includes a plurality of pockets arranged in a circle around said valve body and a ball seated in each of said pockets, in coupling locking position said balls projecting into the passage and seating in a groove in the plug; a sleeve like ring in said conduit and resilient means urging said ring into alignment with said pockets for holding the balls in a radially outwardly displaced position; said balls being of a size when outwardly displaced to project beyond the outer surface of said body into the path of said ring and hold said ring in retracted position.

6. The combination valve and bayonet described in claim 5 wherein resilient means are provided urging said ring to advanced position whereby upon insertion of a plug into the bayonet connection the plug will displace the ring and upon alignment of the groove with the balls their inward displacement will release the retracted sleeve to shift to advanced position closing the bleed passage.

7. The depressurizing means described in claim 4 wherein said slot means is shaped to require the valve actuator to be rotated beyond a position in which the passage in the rotary valve is 90 degrees from its fully open position before the lost motion connection means retracts the sleeve to a position which releases the securing means from the locking means.

* * * * *

UNITED STATES PATENT AND TRADEMARK OFFICE
CERTIFICATE OF CORRECTION

PATENT NO. : 4,552,333
DATED : November 12, 1985
INVENTOR(S) : Pertti K. Niemi

It is certified that error appears in the above-identified patent and that said Letters Patent is hereby corrected as shown below:

Column 2, Line 56:

"passes" should be --passage--.

Column 3, Line 7:

"of" should be --to--.

Column 3, Line 10:

Delete "the" (first occurrence).

Column 3, Line 12:

"squentially" should be --sequentially--.

Signed and Sealed this

Eighth Day of April 1986

[SEAL]

Attest:

DONALD J. QUIGG

Attesting Officer

Commissioner of Patents and Trademarks